United States Patent
Amano et al.

(10) Patent No.: US 6,943,984 B2
(45) Date of Patent: Sep. 13, 2005

(54) MAGNETIC DISC APPARATUS HAVING STATOR STRUCTURE WITH REDUCED DISTORTION

(75) Inventors: Yasuo Amano, Yokohama (JP); Asao Nakano, Kamakura (JP); Yuji Fujita, Yokohama (JP); Nobuyuki Ushifusa, Yokohama (JP); Kouki Uefune, Odawara (JP); Takashi Yamaguchi, Tsuchiura (JP); Toshiyuki Ajima, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/222,311

(22) Filed: Aug. 16, 2002

(65) Prior Publication Data

US 2003/0235005 A1 Dec. 25, 2003

(30) Foreign Application Priority Data

Jun. 21, 2002 (JP) ........................................ 2002-180772

(51) Int. Cl.$^7$ ............................................. G11B 17/08
(52) U.S. Cl. .................................. 360/99.07; 360/99.08
(58) Field of Search ........................... 360/98.07, 99.04, 360/99.08

(56) References Cited

U.S. PATENT DOCUMENTS 5,859,486 A * 1/1999 Nakahara et al. ............ 310/254
6,104,114 A * 8/2000 Takeda et al. ................. 310/90
6,181,038 B1 * 1/2001 Van Rooij .................... 310/89

FOREIGN PATENT DOCUMENTS

JP 06-068592 3/1994

* cited by examiner

Primary Examiner—A. J. Heinz
(74) Attorney, Agent, or Firm—Townsend and Townsend and Crew LLP

(57) ABSTRACT

An object of the invention is to inhibit a turning force of a magnetic disc apparatus from being reduced. In order to achieve the object, there is provided a magnetic disc apparatus having a rotor to which a magnetic disc fixed, and a stator which is filled with a resin between stator coils, wherein a member having a lower expansion coefficient than a thermal expansion coefficient of the resin is arranged between the stator coils.

8 Claims, 11 Drawing Sheets

FIG. 9
(f)
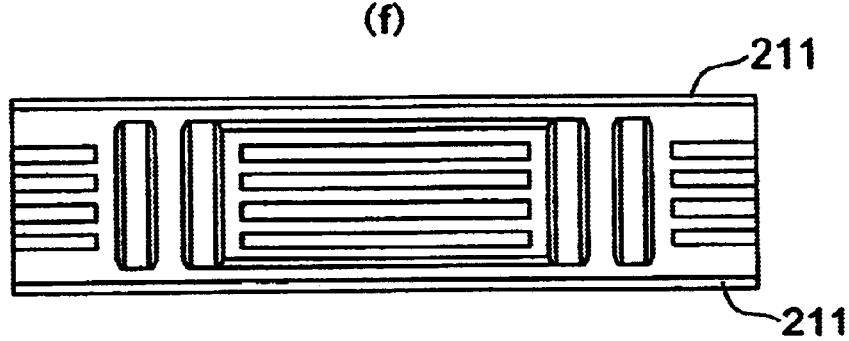
(g)
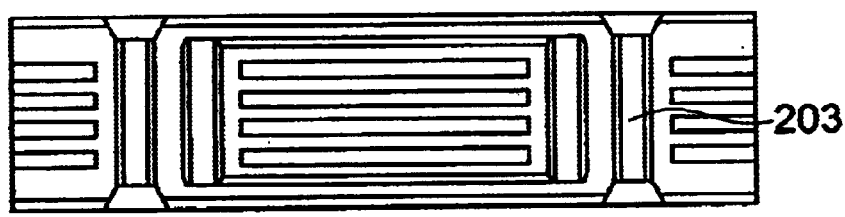
(h)
(i)
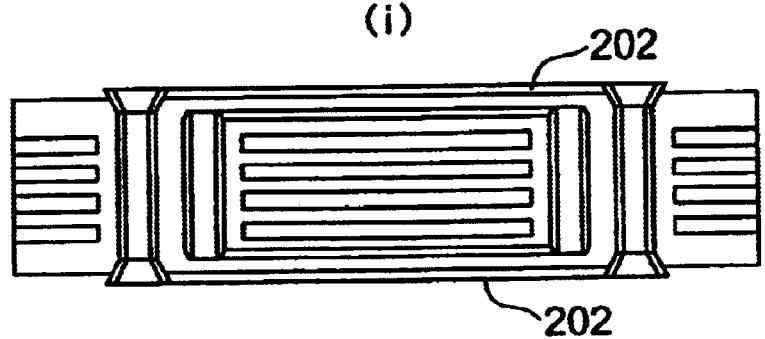

- member/projection
- another projection

MAGNETIC DISC APPARATUS HAVING STATOR STRUCTURE WITH REDUCED DISTORTION

BACKGROUND OF THE INVENTION

1. Field of the Invention

The present invention relates to a magnetic disc apparatus.

2. Description of Prior Art

A conventional embodiment of the magnetic disc apparatus is disclosed in JP-A-6-68592.

A conventional stator coil used in the magnetic disc apparatus mentioned above is frequently formed by actually winding a metal wire around a rotational axis constituted by a stator coil, or by actually turning the metal wire around another member so as to fit to a casing of a stator. A gap between the adjacent stator coils (or stator cores) is left in a space or is molded by a resin.

At present, a requirement with respect to a compact magnetic disc apparatus is increased, for example, in the case that the magnetic disc apparatus is mounted to a portable device.

In order to fulfill the requirement, it is necessary to manufacture a magnetic disc, a magnetic circuit and the like in a small size.

However, in order to obtain a desired starting torque even when the stator becomes in the small size, the stator coil of a fixed size is required. Accordingly, there is generated a requirement of winding the coil in a high density. In the conventional wire wound system, since a thickness of the wire which can stand against a winding force, and a interval between the wires which can secure an insulating property (an amount shifted by one rotation of the coil) are required, there has been a limit in the winding density.

Then, the inventors of the present invention employs a structure which uses a metal core substrate employing a soft magnetic metal plate for a stator core, forms a stator coil by connecting wire around a core material of the metal core substrate by a through hole and a metal wire with utilizing a wiring process, and fills in a portion between the adjacent stator coils with a resin so as to increased a strength.

However, when actually manufacturing the structure, it has been known that a distortion is generated on the metal core substrate in the periphery of the stator core, and the resin filled in the portion between the adjacent stator coils tends to be peeled off from a portion between the stator coil and the stator core, and has an effect on a turning force of the magnetic disc.

SUMMARY OF THE INVENTION

An object of the present invention is to inhibit a turning force of a magnetic disc from being lowered.

The object of the present invention can be solved by the following means.

It is possible to inhibit a resin from peeling off, by arranging a member having a lower thermal expansion coefficient than that of the resin in a gap of a stator coil in which the resin is filled.

The inventors of the present invention have found that the peel-off of the resin is caused by a fact that the thermal expansion coefficient of the resin is higher than the thermal expansion coefficient of the stator coil and the stator core which are made of a metal. That is, in the stator core of the conventional magnetic disc apparatus, a great quantity of heat is not generated because wires are thick, and no problem is generated because a semiconductor package accompanying with heat generation such as an IC driver or the like is arranged in a place apart from the stator. However, since a resistance is increased in accordance with a reduction in width of the wire, the quantity of heat is increased. In particular, in a small magnetic disc capable of being inserted to a slot of PCMCIA card TYPE I using a magnetic disc of 1 inch size which attaches a high value to a portability as mentioned above, since the stator coil is formed by a narrow wire, the quantity of heat becomes large due to an increase of a wiring resistance, and the resin is exposed to a greater temperature cycle than the conventional one. Further, when the downsizing is promoted, it tends to be easily affected by the other heat generation sources, and a cycle width of the temperature cycle is expanded in the same manner.

Then, the inventors of the present invention brings down the thermal expansion coefficient between the stator coils as a whole so as to prevent the resin from being peeled off, by arranging the member having the lower thermal expansion coefficient than that of the resin in the gap between the stator coils in which the resin is filled.

Further, in the case of using a part of the metal core substrate which is used in the stator core as the wiring substrate, the quantity of heat of the semiconductor package accompanying with the heat generation in the IC driver or the like is transmitted to the resin between the stator coils through the core member of the substrate.

Accordingly, in the case of using the metal core substrate mounting the electronic parts thereon for the stator core, there is obtained an effect of further inhibiting the resin from being peeled off.

Further, in the case of using the metal core substrate, it is preferable to integrally form the member with the core member. This is because it is not necessary to insert and hold the resin between the member mentioned above and the core member, and the member can be formed in accordance with the same process as the forming process of the stator core. Further, since an area occupied by the core member is increased in comparison with the case of being formed only by the resin, it is also possible to improve a durability of the casing in the case of attaching the metal core substrate to the casing.

Further, in the case of an aspect in which the stator is formed around the rotor, it is possible to make a width molded by the resin narrow by making the width of the member wider in accordance with an increase of the distance from the rotor. Accordingly, it is possible to inhibit the resin from being peeled off or being cracked in a portion which is apart from the rotor.

In this case, there is another method of reversely widening the width of the stator core so as to make the distance between the stator coils narrow.

Therefore, in accordance with a first aspect of the present invention, there is provided a magnetic disc apparatus comprising:

a rotor to which a magnetic disc and a permanent magnet are fixed; and a stator which is filled with a resin between stator coils, wherein a member having a lower thermal expansion coefficient than a thermal expansion coefficient of the resin is provided between the stator coils.

Further, in accordance with a second aspect of the present invention, there is provided a magnetic disc apparatus as recited in the first aspect, wherein the member is integrally formed with a core of the stator.

Further, in accordance with a third aspect of the present invention, there is provided a magnetic disc apparatus as recited in the first aspect or the second aspect, wherein the member has a width which is narrower toward the rotor, in the case that the stator is formed in a centrifugal direction of the permanent magnet.

Further, in accordance with a fourth aspect of the present invention, there is provided a magnetic disc apparatus comprising:

a rotor to which a magnetic disc is fixed;

a stator which is filled with a resin between stator cores; and a substrate provided with a circuit for applying an electric voltage to the stator, wherein the substrate has a projection having a smaller thermal expansion coefficient than that of the resin between the stator coils.

Further, in accordance with a fifth aspect of the present invention, there is provided a magnetic disc apparatus as recited in the fourth aspect, wherein the substrate is a metal core substrate, and a core of the metal core substrate and the stator core are integrally formed in accordance with the same process.

Further, in accordance with a sixth aspect of the present invention, there is provided a magnetic disc apparatus comprising:

a stator; and a rotor in which a magnetic disc is mounted and a permanent magnet is fixed to a position opposing to a stator coil, wherein a metal core substrate is provided so as to have a soft magnetic metal plate in which a hole for a through hole and holes for a first projection and a second projection that alternately extend in a radial manner are formed on a magnetic metal plate, a resin formed on the holes and both of flat faces and a wiring formed on the resin, and wherein the stator coil is constructed by connecting the wirings on both of the faces of the metal core substrate to the through hole in the periphery of the first projection.

Further, in accordance with a seventh aspect of the present invention, there is provided a magnetic disc apparatus comprising:

a rotor to which a magnetic disc and a permanent magnet are fixed; and a stator which is filled with a resin between stator coils, wherein a width of the stator coil is expanded toward a centrifugal direction, in the case that the stator is formed in the centrifugal direction of the permanent magnet.

Other objects, features and advantages of the invention will become apparent from the following description of the embodiments of the invention taken in conjunction with the accompanying drawings.

BRIEF DESCRIPTION OF THE DRAWINGS

FIG. 9 is a view showing a process of manufacturing the metal core substrate;

PREFERRED EMBODIMENT OF THE INVENTION

A description will be given below of a structure of a magnetic disc apparatus in accordance with the present invention with reference to the accompanying drawings.

Figure 1:
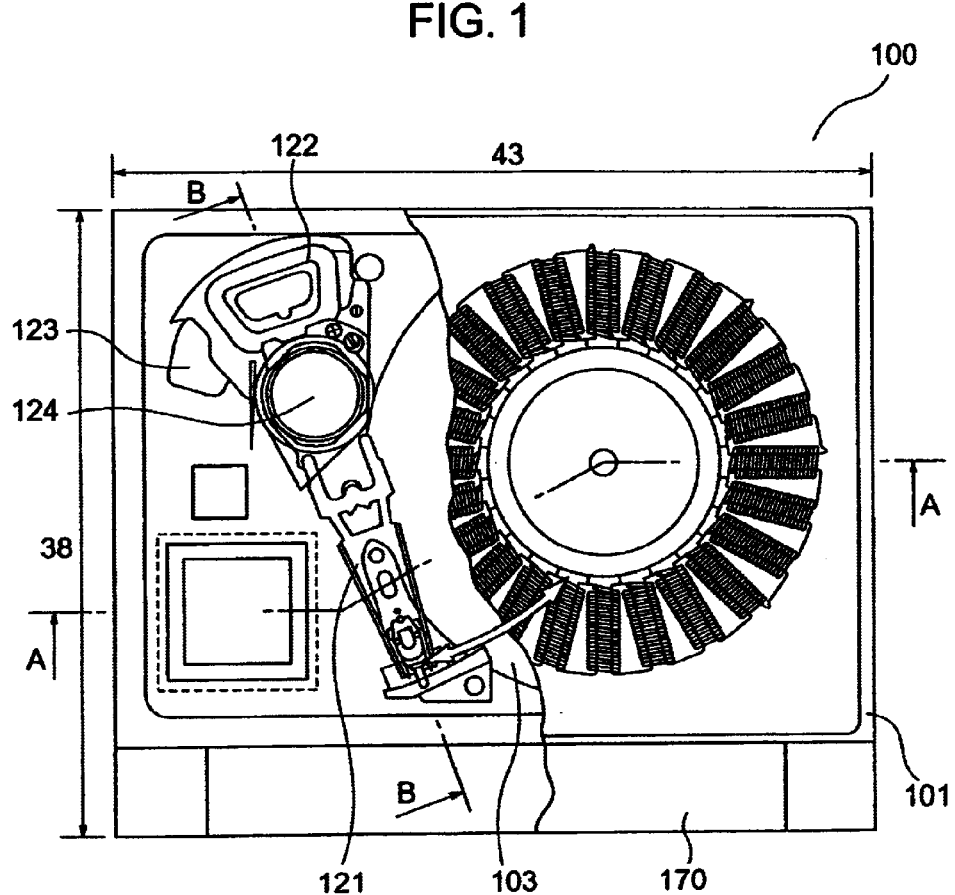
FIG. 1 is a cross sectional view of a main portion in a magnetic disc apparatus.
Figure 2:
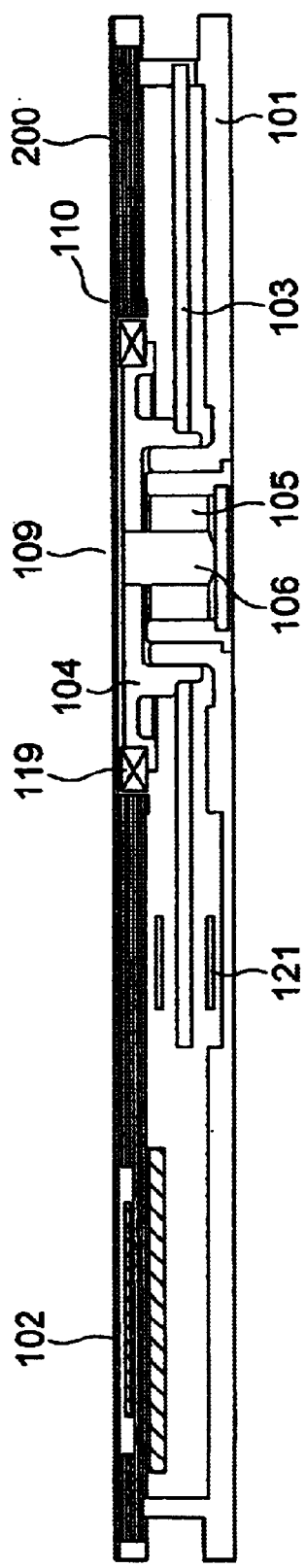
FIG. 2 is a cross sectional view of the magnetic disc apparatus.

FIG. 1 shows a top elevational view in the case of taking out a cover on a top surface of a casing in a magnetic disc apparatus in accordance with the present invention. FIG. 2 is a cross sectional view along a line A—A in FIG. 1. A magnetic disc memory device 100 is structured such that a magnetic disc 103 having an outer diameter of 1 inch, and a rotor portion 109 and a stator portion 110 which drive the magnetic disc are assembled in a space which is surrounded by a base 101, a connector 170 and a cover 102. An outer size of the magnetic disc memory device 100 has the same size as that of a compact flash memory type 1 (43 mm×36 mm×3.3 mm).

An oil retaining bearing 105 is fixed to the base 101, and a hub 104 connected to a shaft 106 is supported by the oil retaining bearing 105 in a rotatable state. The magnetic disc 103 and an annular permanent magnet 119 are fitted to a top surface of the hub 104, and forms a rotor.

On the contrary, a magnetic head (not shown) positioned on a suspension 121 in a far side of a front end of the suspension shown in this drawing seeks on the rotating magnetic disc 103 around a suspension rotational axis 124 by a permanent magnet 123 and a voice coil motor 122 so as to read and write an information.

A metal core 200 has a function of an iron core and a coil winding of a motor, and a function of a wiring substrate mounting parts such as an IC and the like thereon.

A connector 170 in which a plurality of signal pins are formed for sending and receiving electric signals with respect to an external portion of the magnetic disc memory device 100 is mounted in an end portion of the metal core substrate 200.

Next, a description will be given of a structure of the metal core substrate 200 with reference to FIGS. 3 to 6.

Figure 3:
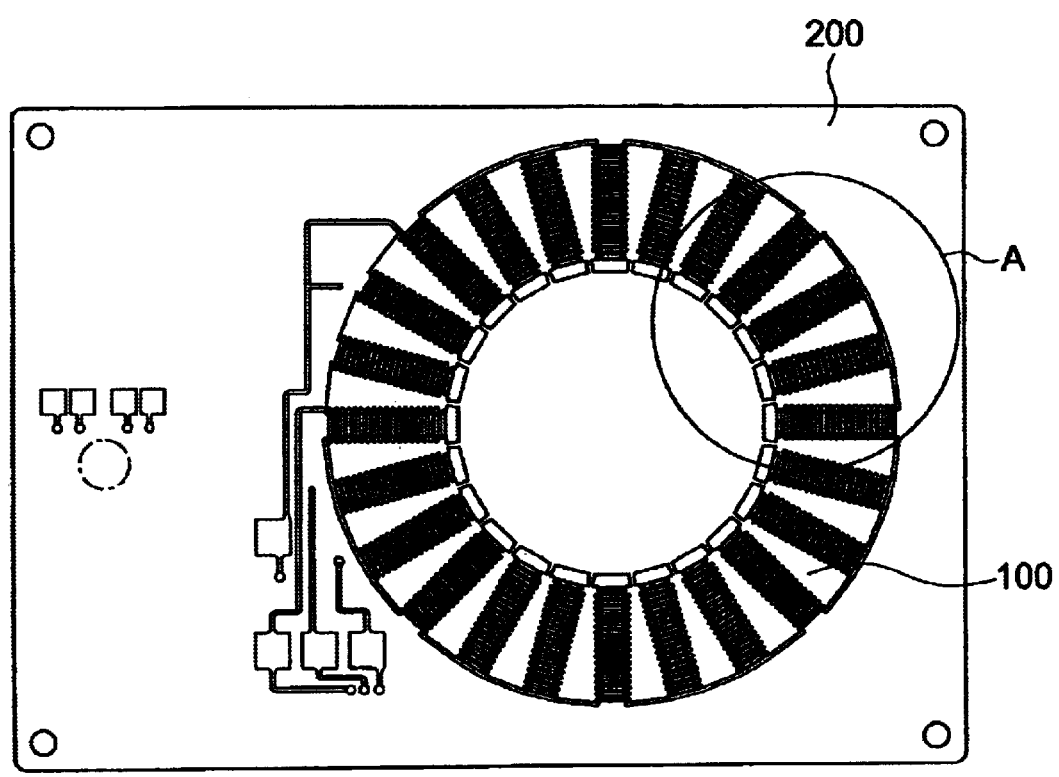
FIG. 3 is a top elevational view showing a whole of a metal core substrate which is used in the magnetic disc apparatus.
Figure 4:
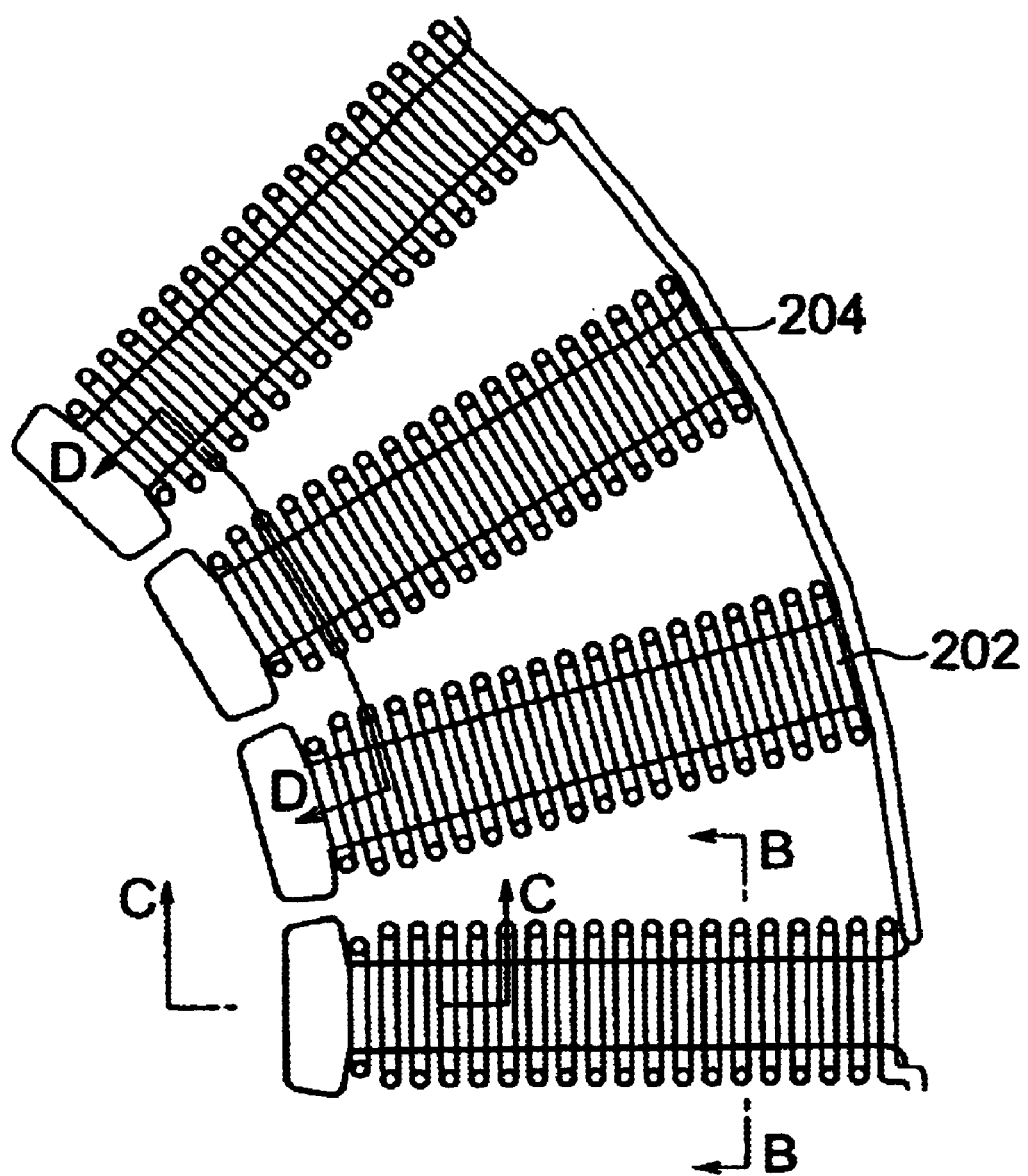
FIG. 4 is an enlarged view of a part in FIG. 3.
Figure 5:
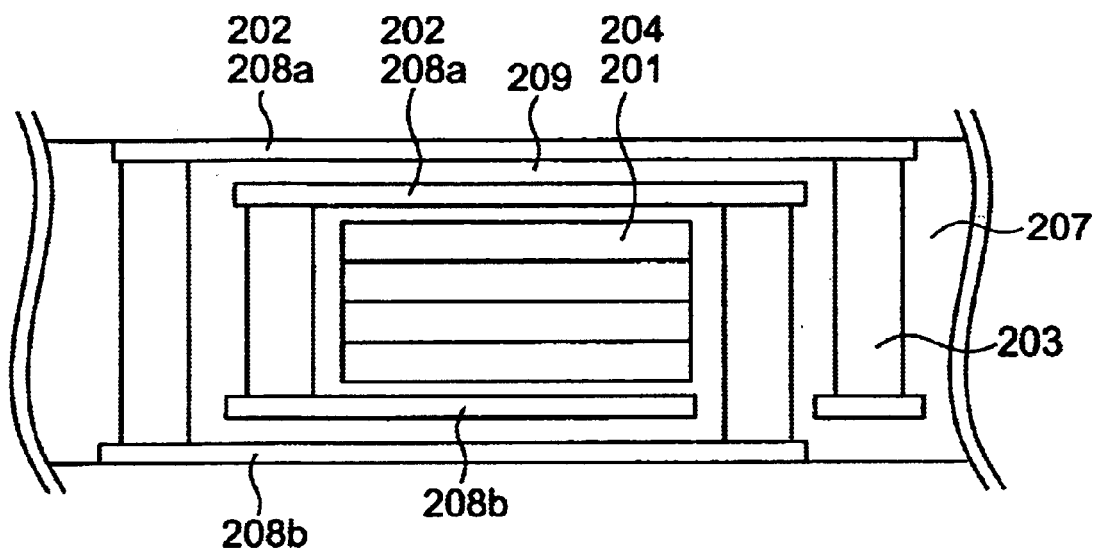
FIG. 5 is a cross sectional view along a line B—B in FIG. 4.
Figure 6:
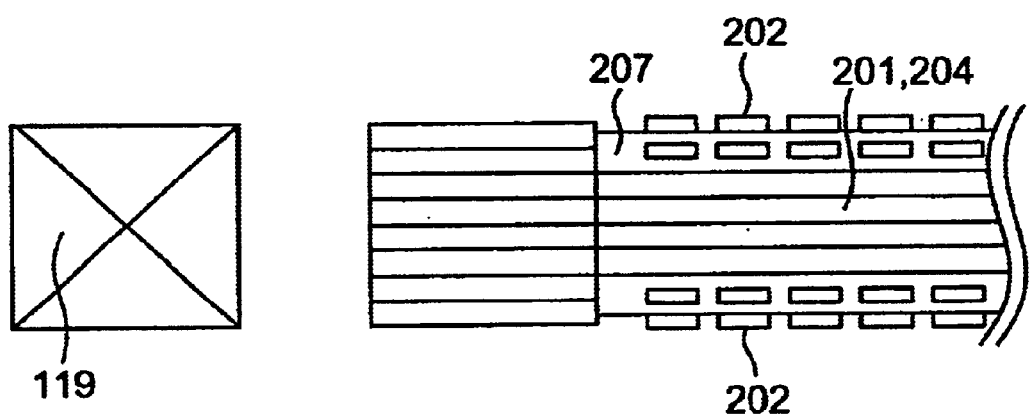
FIG. 6 is a cross sectional view along a line C—C in FIG. 4.

FIG. 3 is a top elevational view showing a whole of the metal core substrate, FIG. 4 is an enlarged view of a portion A in FIG. 3, FIG. 5 is a schematic view showing a cross section along a line B—B in FIG. 4, and FIG. 6 is a schematic view showing a cross section along a line C—C in FIG. 4.

The metal core substrate 200 forms the stator portion 110, and is constituted by four layers of magnetic metal plates 201, a resin portion (an insulating portion) 207, two layers of front face wiring layers 208, two layers of back face wiring layers 208, and a through hole 203, as shown in FIGS. 5 and 6. The magnetic metal plate 201 is a thin laminated plate which is made of a soft magnetic material, for example, a silicon iron, and has a structure having a low core loss of the motor. The magnetic metal plate 201 has a 1.5 times iron core pieces 204 as many as a number of poles of an annular permanent magnet 119, for the purpose of forming the stator portion. In the present aspect, twenty four iron core pieces are provided.

Circuit patterns 202 are formed on a front face and a back face of the magnetic metal plate 201 via an insulating layer 209, and are connected to the through hole 203, thereby being formed in a coil winding structure surrounding the iron core piece 204. The circuit patterns 202 in the respective iron core pieces 204 are electrically connected to each other on the metal core substrate 200, form a magnetic field with respect to the annular permanent magnet 119 by controlling an electric current supplied to the wiring, and generate a torque for rotating the rotor portion 109.

For the matter of that, in FIG. 5, the present stator portion is constituted by two layers of front face wirings 208a, two layers of back face wirings 208b, the magnetic metal plate 201, the through hole 203 and the insulating layer 209, and is formed in a wiring structure which surrounds the magnetic metal 201 at two times in one cross section. However, when the wiring layer is made in multi layers in a process of forming the metal core substrate 200, it is possible to further increase the number of the wiring.

Next, a description will be given of the metal core substrate structure through the forming process.

Figure 7:
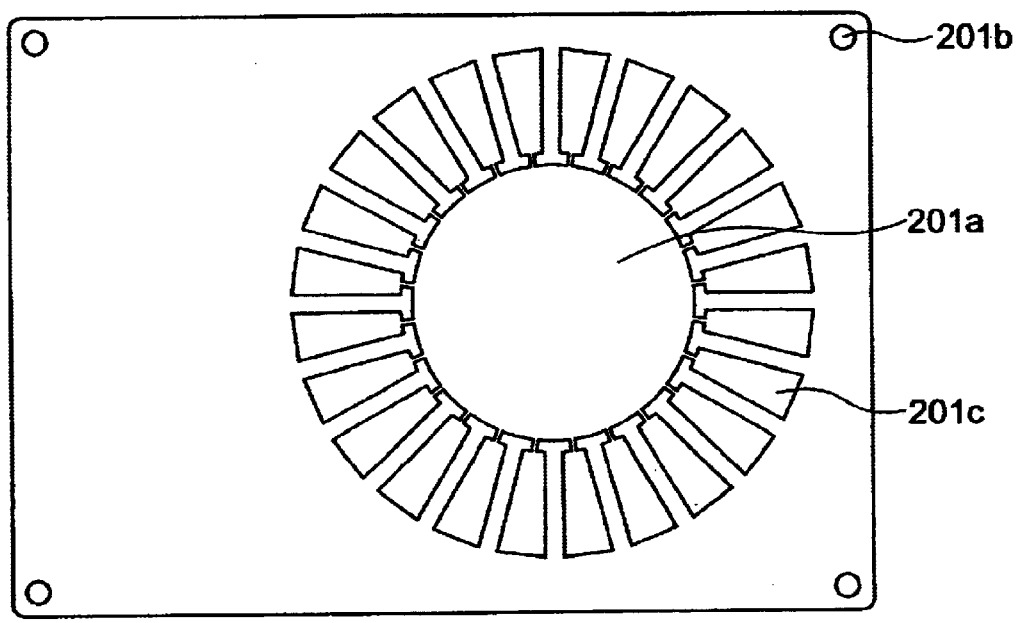
FIG. 7 is a plan view showing a shape of an individual piece in a metal core material.

FIG. 7 is a plan view showing a shape of an individual piece in the metal core material. With respect to a material, the present embodiment employs a thin plate (having a thickness of about 0.1 mm) of the magnetic metal plate made of the silicon iron having a reduced core loss. In the drawing, a central large hole 201a corresponds to a hole in which the hub 104 and the annular permanent magnet 119 are assembled, small holes 201b at four corners correspond to screw holes for fixing the substrate to the casing, and holes 201c in which the through holes 203 are arranged are formed in the periphery of the central hole 201a at twenty four positions which correspond to the number of the poles in the motor. These shapes can be formed by a process of a chemical etching, a punching press or the like. Four individual pieces are bonded and laminated by using an adhesive agent, and the wiring layers are formed in two front and back layers. A description will be given of steps (a) to (i) in FIGS. 8 and 9. Views in FIGS. 8 and 9 all show a cross section along a line D—D in FIG. 4.

Figure 8:
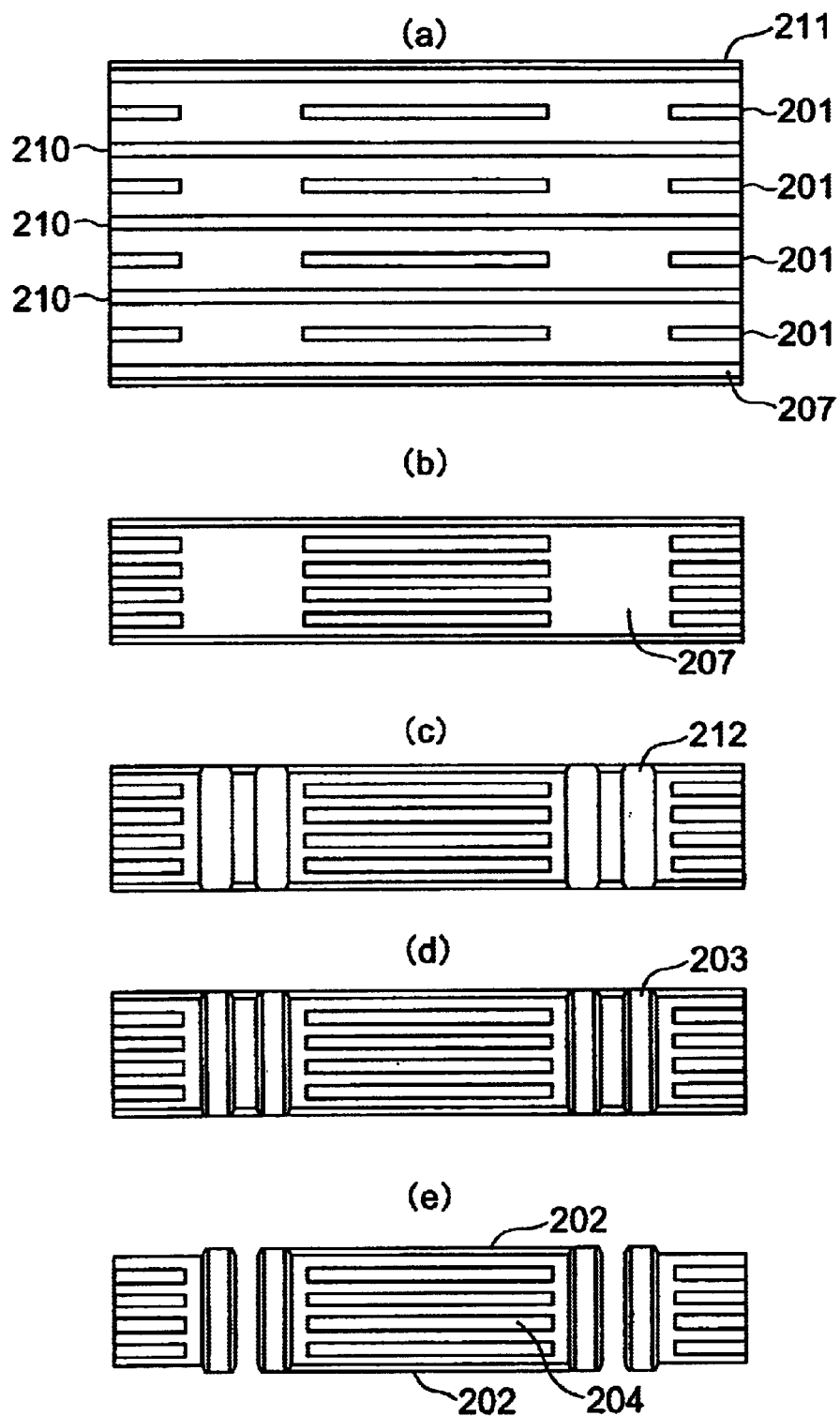
FIG. 8 is a view showing a process of manufacturing a metal core substrate.

The stage (a) in FIG. 8 shows the structure, in which adhesive films 210 such as an epoxy or the like are arranged between four magnetic metal plates 201, and resin coated coppers (RCC) 211 corresponding to copper foils formed by previously applying a resin adhesive layer to one side are arranged in outer sides of both surfaces thereof. When pressing while heating from upper and lower sides in this state by means of a vacuum press apparatus or the like, the epoxy corresponding to a thermosetting resin is melted as shown in the stage (b) in FIG. 8 and is filled in the holes 201a to 201c provided in the magnetic metal plate, and the thin epoxy layers are formed between the magnetic metal plates and bond between the metal plates. A gap between the metal plates is about 0.01 mm. In this state, the epoxy resin is cured, and four magnetic metal plates 201 are laminated so as to become an integrated body with the copper foils attached on the front and back faces. The resin portion 207 in the stage (b) in FIG. 8 corresponds to the hole 201c in FIG. 7. Next, in the stage (c) in FIG. 8, a hole 212 extending through the substrate is formed in the hole portion 201c by means of a drill or a laser. Next, in the stage (d) in FIG. 8, a copper plating is applied to an inner wall of the through hole, and the through hole 203 is formed by electrically conducting between the copper foils on the front and back faces. Next, in the stage (e) in FIG. 8, the circuit pattern 202 corresponding to an inner layer is formed in accordance with a copper etching process. At this time, it is formed in a such a manner as to surround the portion corresponding to the iron core piece 204 in the magnetic metal plate 201. Next, in the stage (f) in FIG. 9, the RCCs 211 are further arranged on the front and back faces, and are pressed in the same manner as that of the stage (b) in FIG. 8. Next, in the stage (g) in FIG. 9, the hole is pierced toward the other through hole 203 than the circuit pattern formed in the stage (f) in FIG. 9 in accordance with the laser or the like, the copper plating is applied in the stage (h) in FIG. 9, and the circuit pattern 202 corresponding to the outer layer is formed in the stage (i) in FIG. 9. In this case, it goes without saying that the circuit pattern is formed not only in the coil winding shape applied to the iron core piece of the magnetic metal plate but also in a shape including all of the connection to the individual coil winding shape, the other parts mounting pattern, the circuit to the connector 170 and the like. Thereafter, the central hole 201a and the holes 201b at four corners are removed in accordance with the drilling, the laser or the press punching. On the basis of the steps mentioned above, the metal core substrate shown in FIG. 3 is finished.

Here, we have found that the following problems are generated in the case of forming in the shape mentioned above and in accordance with the steps mentioned above.

One of them is a point that a great torsion to a maximum of about 2 mm is generated in the whole of the metal core substrate in the stage the stage (b) in FIG. 8. The torsion in this stage causes a deterioration in accuracy of position for piercing the through hole in the next step, and causes a short circuit between the circuit patterns or a short circuit between the circuit pattern and the magnetic metal plate corresponding to the base member. Accordingly, this torsion prevents a pitch between the circuit patterns from being made small, and prevents a performance serving as the motor from being increased (in view of the motor performance, it is advantageous to make a cross sectional area of the circuit patter large and increase the number of coil winding). Further, in the case of assembling the substrate having the torsion in the casing, it is necessary that a rigidity of the casing is sufficiently large with respect to the substrate, however, in order to make the structure thin which corresponds to the object of the present invention, it is not possible to make the rigidity of the casing sufficient. In reverse, in accordance with the present aspect, the substrate is designed to be rigid by being formed as a part of the casing. If the torsion is generated in the casing, the motor performance is deteriorated, a degree of parallelization between the magnetic disc and the magnetic head gets out of order, and the basic performance of the magnetic disc apparatus is deteriorated.

In this case, the inventors of the present invention have found that the torsion can be improved very much and becomes about 0.5 mm by removing the central hole 201a at the end of the step mentioned above.

The torsion is generated because a shrinkage on curing of the used resin or a linear expansion coefficient thereof is different from that of the magnetic metal plate. The linear expansion coefficient of the resin is 60 to 80 ppm while the linear expansion coefficient of the magnetic metal plate is 11.8 ppm. That is, the linear expansion coefficient of the resin is three times or more as much as the linear expansion coefficient of the magnetic metal plate. Further, it is said that the shrinkage on curing of the resin (a volume change rate after the resin is cured from the melding state) is about 2%.

Since the resin applies a force in a direction of pulling the peripheral magnetic metal plate at a time of being returned to the room temperature after being heated and pressed, due to the difference, the magnetic metal plate is deformed. Accordingly, in order to reduce the deformation, it is preferable to reduce the area of the resin.

Figure 10:
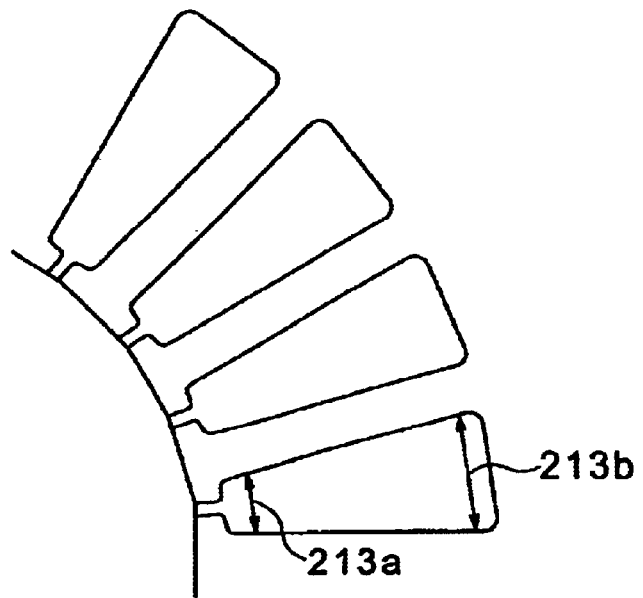
FIG. 10 is an enlarged view of a core resin portion.

FIG. 10 is an enlarged view of the stator core resin portion. As is understood from the drawing, a width of the resin portion in a circumferential direction is larger in a far side 213b than in a near side 213a with respect to a center. That is, the width in the far side 213b is about twice as much as the width in the near side 213a. This causes a different amount of shrinkage of the resin in accordance with the position in the radial direction, and increases the deformation of the magnetic metal plate.

A countermeasure against the matter mentioned above includes the following items. (1) The area of the resin portion is made small. (2) The width of the resin portion in the circumferential direction is made constant. (3) The linear expansion coefficient and the amount of shrinkage on curing of the resin are made small. A description will be given below of these countermeasures.

Figure 11:
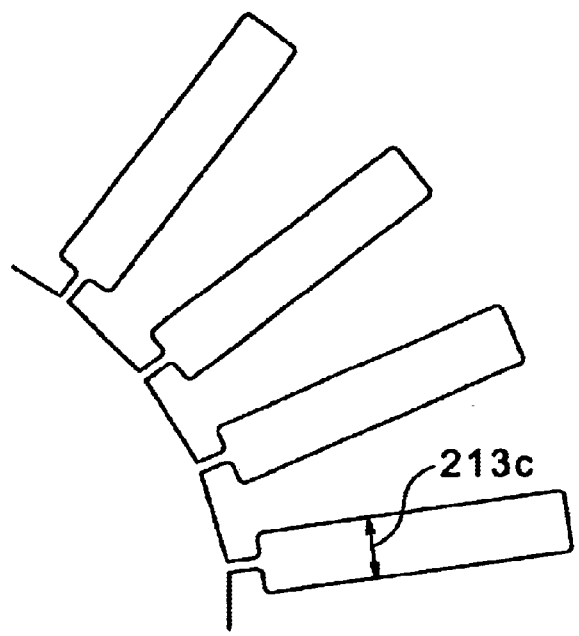
FIG. 11 is an enlarged view of a stator core resin portion.

FIG. 11 shows an embodiment in which the iron core piece portion of the magnetic metal plate is formed in such a shape that the area of the core resin portion is made small and a width 213c of the resin portion in the circumferential direction is made constant with respect to a diametrical direction. In this case, since two layers of circuit patterns are formed on each of the front and back faces in the motor structure of the present means, it goes without saying that it is necessary to form four through holes in the circumferential direction as mentioned above, and the width 213c is set to a minimum size with taking into consideration the working accuracy of the gap size between the through holes and the gap size between the through hole and the iron core piece. In the present means, since the torsion of the metal core substrate becomes equal to or less than 0.1 mm by removing the central hole 201a, no problem is generated.

However, in the present means, since the width of the iron core piece in the magnetic metal plate becomes wider as moving close to the outer periphery, a distance of the circuit pattern corresponding to the coil becomes long, so that the motor performance is somewhat made light. A description will be given of the second means with reference to FIG. 12.

The present means is structured such that a convex portion is formed in the magnetic metal plate toward an inner peripheral portion from the outer peripheral portion of the core resin portion with a width leaving twice as much as the width of the innermost portion. By employing the shape mentioned above, it is possible to make the resin area small and lost the difference between the inner periphery and the outer periphery without increasing the distance of the circuit pattern as is different from the first means mentioned above. The present means has the same effect with respect to the torsion as that of the first means.

Figure 12:
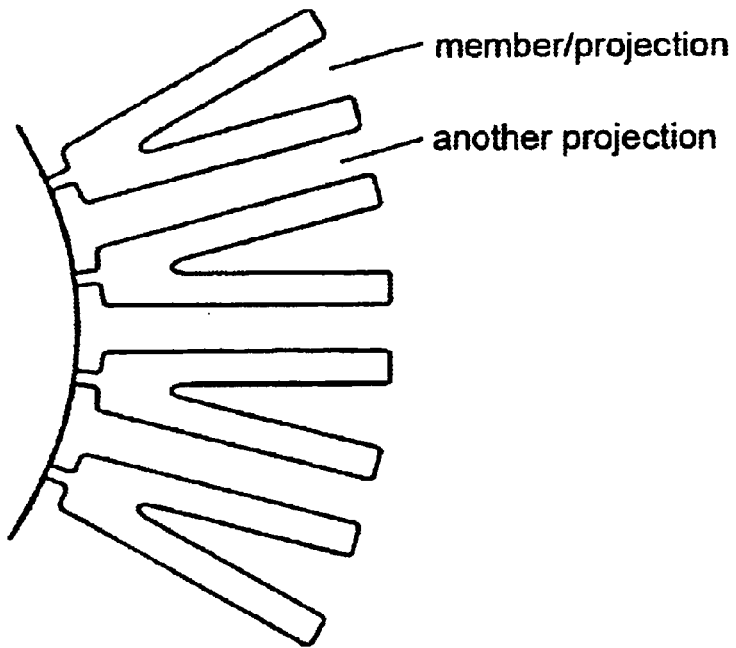
FIG. 12 is an enlarged view of the stator core resin portion.

A description will be given of a method of manufacturing the structure shown in FIG. 12 with reference to FIGS. 13 and 14.

Figure 13:
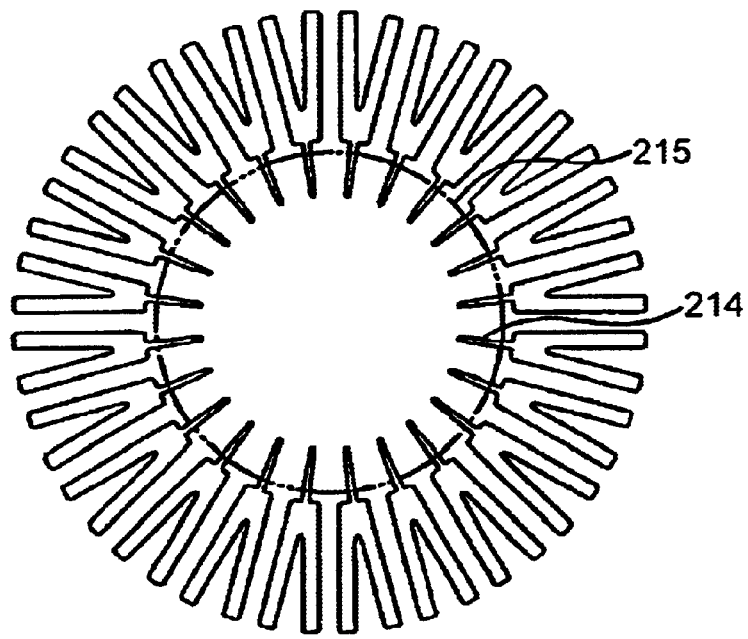
FIG. 13 is an enlarged view of the stator core resin portion.

In accordance with the method shown in FIG. 13, a slit corresponding to a gap 214 between the adjacent magnetic metal plates forming the core is previously formed up to a portion which is smaller than a diameter of a circle 215 cut off in a post-process, the magnetic metal plate is cut off in the portion corresponding to the circle after lamination, and the central hole 201a is formed. In accordance with this method, only the slit portion is formed in the portion corresponding to the central hole 201a by the resin at a time of lamination, and the deformation of the magnetic metal plate is hardly generated due to the shrinkage of the resin.

Figure 14:
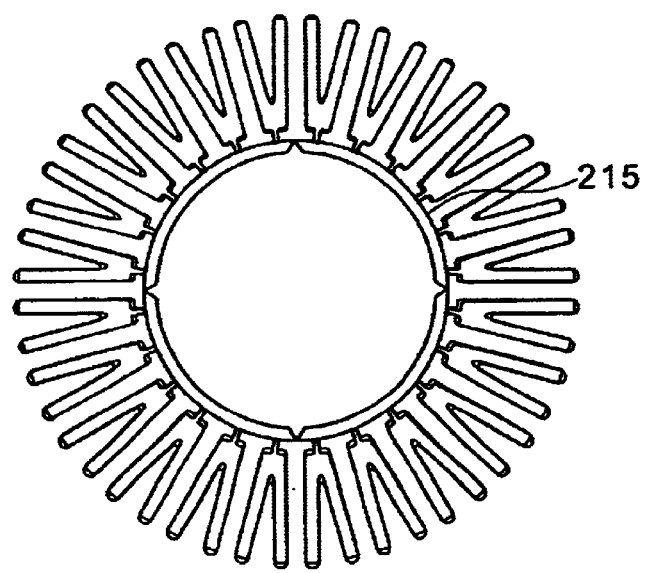
FIG. 14 is a plan view showing a shape of an individual piece in the metal core material.

The method shown in FIG. 14 corresponds to an example in which a magnetic metal plate constituted by a circle which is a little smaller than the cut-off circle 215 mentioned above is formed by a magnetic metal plate formed in such a manner as to be connected to the magnetic metal plate of the main body in some positions of the circumference. In accordance with this method, in comparison with the method shown in FIG. 13, the cut-off process for forming the central hole can be more easily performed because the material to be cut off is the resin. Accordingly, in the cut-off process by means of the laser, the process can be performed at a higher speed, and in the cut-off process by means of the press molding, a service life of the metal mold becomes long, so that a great cost advantage can be obtained. Further, in accordance with the third means, the magnetic metal mold is exposed to the cut-off end face, and a problem concerning corrosion is generated, however, in accordance with the present method, since the end face is covered with the resin, a better advantage can be obtained.

Figure 15:
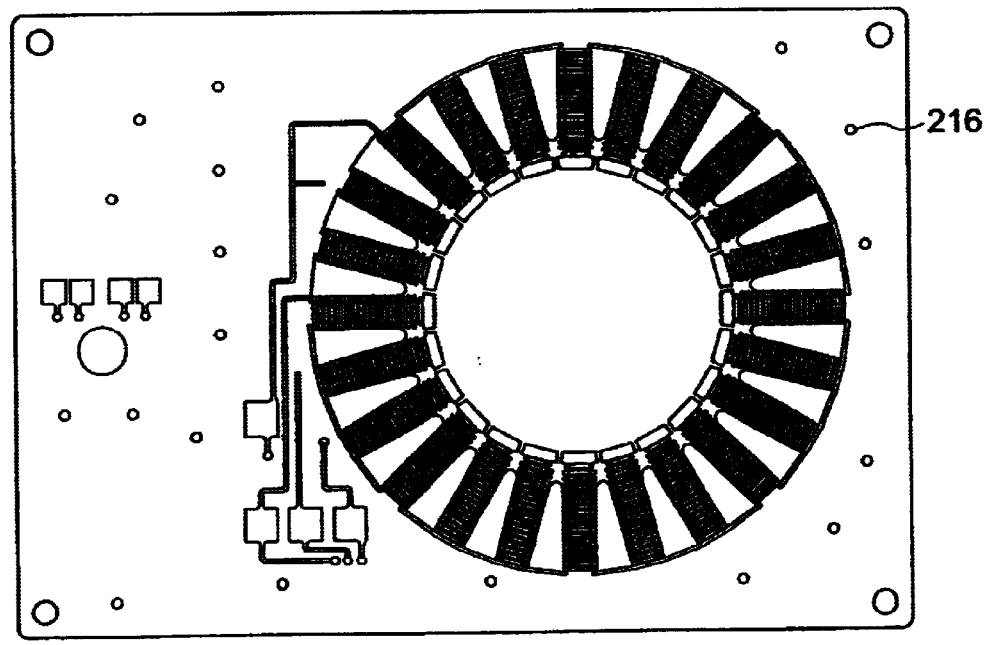
FIG. 15 is a plan view showing a shape of the individual piece in the metal core material.

A description will be given of the other means with reference to FIG. 15.

The present means corresponds to an example in which the linear expansion coefficient or the shrinkage on curing of the resin is made small, in correspondence to the torsion countermeasure (3). In order to make the linear expansion coefficient or the shrinkage on curing without changing the base member of the resin, it is general that a filler such as an aluminum borate and the like is contained. It is possible to set the linear expansion coefficient to 20 ppm, that is, substantially the same level as that of the magnetic metal plate, by the filler being contained therein. However, an adhesive strength with respect to the magnetic metal plate is lowered by making the filler being contained therein. Then, in accordance with the present means, the structure is made such that a plurality of through holes each having a diameter of about 0.5 to 1.0 mm are previously provided on the magnetic metal plate in the portion having no interference with the circuit pattern or the portion having no relation to the necessary magnetic line of force. By arranging the through holes, since the resin is filled in the through holes at a time of laminating the magnetic metal plate, the displacement of the magnetic metal plate is hard to be generated between the layers, and the strength between the layers in the peel-out direction is increased.

In accordance with the means mentioned above, it is possible to obtain the metal core substrate in which the adhesive strength between the layers is high, and no torsion and no warp are provided.

The metal core substrate having the structure mentioned above is used, and is mounted to the magnetic disc 103, the hub 104 and the oil retaining bearing 105 in the manner as shown in FIG. 1, and the rotor portion 109 is fixed to the base 101. Thereafter, the metal core substrate 200 is fixed to the base 101. Finally, the cover (not shown) is mounted, and the magnetic disc memory device is finished.

In the conventional motor structure on the basis of the coil winding, since the coil winding is formed by winding the copper wire around the iron core piece, it is necessary to sufficiently expand the interval between the leading ends of the iron core pieces to the extent of about 1.5 mm. Accordingly, there is a limit in the method of increasing the cross sectional area of the iron core piece which is arranged in the periphery of the annular permanent magnet 119, and it is hard to increase the torque of the thin type motor. In the present invention, since the iron core and the coil winding are formed in accordance with the wiring substrate process, it is possible to move the iron core pieces close to each other in accordance the thin metal plate and insulating layer are employed. If the thin plate having the thickness of about 0.1 mm is employed in accordance with the present invention, it is possible to make the interval between the leading ends of the iron core pieces close to 0.1 mm. Accordingly, it is possible to place the iron core pieces in all the peripheral area of the annular permanent magnet 119, and it is possible to increase the torque in comparison with the conventional motor having the same thickness in accordance with the coil winding type.

As mentioned above, in accordance with the present invention, it is possible to inhibit the turning force of the magnetic disc apparatus from being reduced.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A magnetic disc apparatus comprising:
   a rotor to which a magnetic disc and a permanent magnet are affixed;
   a stator having a resin disposed between stator coils, the resin having a first thermal expansion coefficient; and
   a member having a second thermal expansion coefficient, which is lower than the first thermal expansion coefficient, provided between the stator coils.

2. A magnetic disc apparatus as in claim 1 wherein the member is integrally formed with a core of the stator.

3. A magnetic disc apparatus as in claim 1 wherein the member tapers from narrow portions nearer the rotor to wider portions further from the rotor.

4. A magnetic disc apparatus as in claim 2 wherein the member tapers from narrow portions nearer the rotor to wider portions further from the rotor.

5. A magnetic disc apparatus comprising:
   a rotor to which a magnetic disc is affixed;
   a stator having resin disposed between stator cores; and
   a substrate provided with a circuit for applying an electric voltage to the stator;
   wherein the substrate includes a portion having a projection to be disposed in the resin between the cores, which projection has a smaller thermal expansion coefficient than that of the resin.

6. A magnetic disc apparatus as in claim 5 wherein the substrate includes a metal core formed integrally with the stator cores.

7. A magnetic disc apparatus comprising:
   a stator;
   a rotor on which a magnetic disc is mounted and a permanent magnet is affixed to oppose a stator coil;
   a metal core substrate including a soft magnetic metal plate in which a through hole is provided, and including first projecting regions and second projecting regions extending toward the metal core in a radial manner;
   a resin formed on the substrate;
   electrically conductive wiring formed on the resin; and
   wherein the stator coil is connected in the periphery of the first projection.

8. A magnetic disc apparatus comprising:
   a rotor to which a magnetic disc and a permanent magnet are affixed;
   a stator having resin between stator coils, the coils having a first width at an interior location; and
   wherein the width of the stator coils increases in a radial direction to a second width greater than the first width.

* * * * *